Patented Dec. 24, 1935

2,025,024

UNITED STATES PATENT OFFICE 2,025,024

PURIFICATION OF CHLORINATED HYDROCARBONS

Edgar C. Britton, Gerald H. Coleman, John W. Zemba, and Edward C. Zuckermandel, Midland, Mich., assignors to The Dow Chemical Company, Midland, Mich., a corporation of Michigan No Drawing. Application November 2, 1933, Serial No. 696,410

13 Claims. (Cl. 260—162)

This invention concerns a method of purifying chlorinated aliphatic hydrocarbons, particularly tetrachloroethylene.

Many chlorinated aliphatic hydrocarbons, e. g. tetrachloroethylene, trichloroethylene, pentachloroethane, allylchloride, etc., of commercial grade are contaminated with relatively unstable toxic impurities which cannot be removed by usual methods, e. g. fractional distillation, scrubbing with aqueous solutions of alkaline reagents, etc., or become so contaminated on standing under exposure to light. The presence of such impurities renders the materials unsuited to certain purposes, e. g. pharmaceutical uses, wherein the pure chlorinated aliphatic hydrocarbons are required.

The composition of the unstable toxic impurities usually present in chlorinated aliphatic hydrocarbons is not known. However, they have been found to form with benzidine a yellow color or a flocculent precipitate which cannot readily be removed by filtration. Thus the presence of such impurities can readily be detected by treating a sample of the chlorinated aliphatic hydrocarbon with an approximately equal volume of a 10 per cent solution of benzidine in benzene and permitting the resultant solution to stand in the dark for 12 hours. If at the close of this period a yellow color or a precipitate has developed, impurities of the type mentioned above are present. If no yellow color or precipitate has developed, the chlorinated aliphatic hydrocarbon is practically free of such impurities. This test will hereinafter be referred to as the "benzidine test".

We have now found that the impurities hereinbefore referred to can readily be removed from any chlorinated aliphatic hydrocarbon, which is stable under atmospheric conditions in the absence of light, by treating the crude chlorinated aliphatic hydrocarbon with a nitrogen base. After such treatment, tetrachloroethylene can readily be separated in substantially pure form by fractional distillation. Certain chlorine derivatives of aliphatic hydrocarbons, e. g. 1.1-dichloroethylene, monochloroacetylene, dichloroacetylene, etc., are unstable under atmospheric conditions and cannot be purified by the present method.

The invention, then, consists in the method of purifying chlorine derivatives of aliphatic hydrocarbons hereinafter fully described and particularly pointed out in the claims, the following description and examples setting forth in detail only several of the various ways in which the principle of the invention may be employed.

The following description illustrates our invention as applied to the purification of commercial tetrachloroethylene.

Tetrachloroethylene, which is contaminated with relatively unstable toxic impurities, is treated with a small amount, e. g. about 1 per cent its weight or more, of a nitrogen base, and relatively pure tetrachloroethylene is fractionally distilled from the resultant mixture or solution. The treatment of the impure tetrachloroethylene with the nitrogen base is continued for a sufficient time to remove all of the impurities, usually about one hour or longer.

The treatment with a nitrogen base may be carried out in a variety of ways. For instance, a gaseous nitrogen base, e. g. ammonia, methyl amine, etc., may be bubbled through impure tetrachloroethylene for a sufficient period, e. g. about 12 hours, at room temperature. Again, a solution or mixture of a solid or liquid nitrogen base, e. g. benzidine or aniline, in impure tetrachloroethylene may be heated under reflux or under pressure for a sufficient period, e. g. about 1–3 hours. Regardless of the exact procedure followed in carrying out such treatment, the resultant mixture or solution can be fractionally distilled to obtain a relatively pure grade of tetrachloroethylene.

The so treated tetrachloroethylene is usually sufficiently pure for most pharmaceutical purposes. However, if the product is found still to give a positive benzidine test, it may be further purified by again treating it in accordance with the procedure described above.

In our method about 1 per cent of the nitrogen base has been found to be most generally adapted to the treatment of ordinary commercial tetrachloroethylene. It will be understood, however, that when the tetrachloroethylene to be purified contains only minute traces of impurities, a smaller quantity of nitrogen base may be sufficient. Also, when other chlorinated aliphatic hydrocarbons, e. g. isobutyl chloride, trichloroethylene, pentachloroethane, etc., are to be purified by our method, the quantity of nitrogen base to be employed will be dependent upon the amount of impurities present.

The following examples describe several ways in which the invention has been practiced, but are not to be construed as limiting the invention. In said examples, the impure tetrachloroethylene employed was from stock which has first been tested and found to give a strongly positive benzidine test.

Example 1

A slow stream of ammonia gas was bubbled, at room temperature and for a period of 12 hours, through impure tetrachloroethylene. The mixture was then fractionally distilled to separate the purified tetrachloroethylene. The latter was found to give a negative benzidine test.

Example 2

A mixture of 310 grams of impure tetrachloroethylene and 13 grams of 27 per cent aqueous ammonia solution was stirred at room temperature over night. The mixture was then dried over calcium chloride, after which tetrachloroethylene was fractionally distilled therefrom. The so-treated tetrachloroethylene was found to give a negative benzidine test.

Example 3

A mixture of 310 grams of impure tetrachloroethylene and 3 grams of aniline was heated under reflux for 1 hour. The mixture was then fractionally distilled to separate the purified tetrachloroethylene. The latter was found to give a negative benzidine test.

In addition, samples of the following other chlorinated aliphatic hydrocarbons were tested and found to contain impurities which gave a positive benzidine test:—trichloroethylene, pentachloroethane, allyl chloride, ethylene chloride, propylene chloride, 1,3-dichloroisobutane, and isobutyl chloride. Each of said impure compounds was purified by procedure similar to that hereinbefore described. The purified compounds gave, in each instance, a negative benzidine test.

In addition to the nitrogen bases hereinbefore mentioned, the following other nitrogen bases have been used in purifying chlorinated aliphatic hydrocarbons by our method:—triethyl amine, ethylene diamine, monoethanol amine, diethanol amine, triethanolamine, methyl aniline, dibutyl amine, 1,3-diamino-isopropyl alcohol, benzidine, 4-phenylene-diamine, 2-amino-diphenyl, beta-naphthylamine, 4,4′-diamino-diphenyl oxide, dicyclohexyl amine, quinoline, and pyridine. Diaryl amines and tertiary amines having one or more aryl substituents linked with the amino group, e. g. diphenyl amine, dinaphthyl amine, dimethyl aniline, methyl diphenyl amine, triphenyl amine, etc., are so nearly neutral that they will not react appreciably with impurities of the type hereinbefore referred to. Such weakly basic or neutral amines cannot, of course, be employed satisfactorily for the purification of chlorinated aliphatic hydrocarbons by our method. Insofar as we are aware, however, all primary amines, secondary amines containing not more than one aryl substituent linked with the basic nitrogen atom, tertiary alkyl amines, saturated ring nitrogen bases, and pyridine bases can be used successfully as nitrogen bases in practicing our invention.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a method of removing from a chlorinated aliphatic hydrocarbon which is stable under atmospheric conditions in the absence of light an impurity which is capable of giving a positive benzidine test and which cannot be removed by washing the impure chlorinated aliphatic hydrocarbon with an aqueous solution of an alkaline reagent, the steps which consist in treating the impure chlorinated aliphatic hydrocarbon with a nitrogen base selected from the class consisting of primary amines, secondary amines containing not more than one aryl substituent linked with the basic nitrogen atom, tertiary alkyl amines, saturated ring nitrogen bases, and pyridine bases, and thereafter fractionally distilling the mixture to separate said chlorinated aliphatic hydrocarbon.

2. In a method of removing from a chlorinated aliphatic hydrocarbon which is stable under atmospheric conditions in the absence of light an impurity which is capable of giving a positive benzidine test and which cannot be removed by washing the impure chlorinated aliphatic hydrocarbon with an aqueous solution of an alkaline reagent, the steps which consist in treating the impure chlorinated aliphatic hydrocarbon with a non-gaseous nitrogen base selected from the class consisting of primary amines, secondary amines containing not more than one aryl substituent linked with the basic nitrogen atom, tertiary alkyl amines, saturated ring nitrogen bases, and pyridine bases, and thereafter fractionally distilling the mixture to separate said chlorinated aliphatic hydrocarbon.

3. In a method of removing from a liquid chlorinated aliphatic hydrocarbon which is stable under atmospheric conditions in the absence of light an impurity which is capable of giving a positive benzidine test and which cannot be removed by washing the impure chlorinated aliphatic hydrocarbon with an aqueous solution of an alkaline reagent, the steps which consist in treating the impure chlorinated aliphatic hydrocarbon with aniline, heating the mixture, and thereafter fractionally distilling the mixture to separate said chlorinated aliphatic hydrocarbon.

4. In a method of removing from a chlorinated aliphatic hydrocarbon which is stable under atmospheric conditions in the absence of light an impurity which is capable of giving a positive benzidine test and which cannot be removed by washing the impure chlorinated aliphatic hydrocarbon with an aqueous solution of an alkaline reagent, the steps which consist in treating the impure chlorinated aliphatic hydrocarbon with a gaseous nitrogen base selected from the class consisting of ammonia and gaseous alkyl amines, and thereafter fractionally distilling the mixture to separate said chlorinated aliphatic hydrocarbon.

5. In a method of removing from a liquid chlorinated aliphatic hydrocarbon which is stable under atmospheric conditions in the absence of light an impurity which is capable of giving a positive benzidine test and which cannot be removed by washing the impure chlorinated aliphatic hydrocarbon with an aqueous solution of an alkaline reagent, the steps which consist in contacting a stream of ammonia gas with the impure chlorinated aliphatic hydrocarbon and thereafter fractionally distilling the resultant mixture to separate said chlorinated aliphatic hydrocarbon.

6. In a method of purifying tetrachloroethylene, the steps which consist in treating impure tetrachloroethylene with a nitrogen base selected from the class consisting of primary amines, secondary amines containing not more than one aryl substituent linked with the basic nitrogen atom, tertiary alkyl amines, saturated ring nitrogen bases, and pyridine bases, and fractionally distilling tetrachloroethylene from the resultant mixture.

7. In a method of purifying tetrachloroethylene, the steps which consist in treating impure tetrachloroethylene with a non-gaseous nitrogen base selected from the class consisting of primary amines, secondary amines containing not more than one aryl substituent linked with the basic nitrogen atom, tertiary alkyl amines, saturated ring nitrogen bases, and pyridine bases, and thereafter fractionally distilling tetrachloroethylene from the mixture.

8. In a method of purifying tetrachloroethylene, the steps which consist in treating impure tetrachloroethylene with at least 1 per cent its weight of a non-gaseous nitrogen base selected from the class consisting of primary amines, secondary amines containing not more than one aryl substituent linked with the basic nitrogen atom, tertiary alkyl amines, saturated ring nitrogen bases, and pyridine bases, heating the mixture, and thereafter fractionally distilling tetrachloroethylene from the mixture.

9. In a method of purifying tetrachloroethylene, the steps which consist in adding aniline to impure tetrachloroethylene, heating the mixture, and thereafter fractionally distilling tetrachloroethylene from the mixture.

10. In a method of purifying tetrachloroethylene, the steps which consist in adding triethanolamine to impure tetrachloroethylene, heating the mixture for at least one hour, and thereafter fractionally distilling tetrachloroethylene from the mixture.

11. In a method of purifying tetrachloroethylene, the steps which consist in treating impure tetrachloroethylene with a gaseous nitrogen base selected from the class consisting of ammonia and gaseous alkyl amines, and thereafter fractionally distilling the resultant mixture to separate tetrachloroethylene therefrom.

12. In a method of purifying tetrachloroethylene, the steps which consist in treating impure tetrachloroethylene with ammonia gas and thereafter fractionally distilling the resultant mixture to separate tetrachloroethylene therefrom.

13. In a method of purifying tetrachloroethylene, the steps which consist in contacting a stream of ammonia gas with impure tetrachloroethylene at approximately room temperature and thereafter fractionally distilling the resultant mixture to separate tetrachloroethylene therefrom.

EDGAR C. BRITTON.
GERALD H. COLEMAN.
JOHN W. ZEMBA.
EDWARD C. ZUCKERMANDEL.